VARIABLE RELUCTANCE SHAFT POSITION TO-DIGITAL CONVERTER

Original Filed May 17, 1965

4 Sheets-Sheet 1

INVENTORS:
DONALD D. CHRISTENSEN
WILLIAM F. FRAZIER
BY
ATTORNEY

VARIABLE RELUCTANCE SHAFT POSITION TO-DIGITAL CONVERTER

Original Filed May 17, 1965

United States Patent Office 3,513,469
Patented May 19, 1970

3,513,469

VARIABLE RELUCTANCE SHAFT POSITION-TO-DIGITAL CONVERTER

Donald D. Christensen, Sun Valley, and William F. Frazier, Sylmar, Calif., assignors to Singer-General Precision, Inc., a corporation of Delaware Continuation of application Ser. No. 463,433, May 17, 1965. This application Mar. 3, 1969, Ser. No. 806,010
Int. Cl. G08c 9/04
U.S. Cl. 340—347 6 Claims

ABSTRACT OF THE DISCLOSURE

This invention relates to magnetic converters or encoders and comprises the combination of a coded information ferromagnetic disk having raised and recessed portions on one surface thereof in the form of any suitable analog-to-digital encoder pattern. A magnet is positioned on the underside of the disk. In place of conventional contact brushes there are provided conventional magnetic read heads or pickups. The magnet placed on the underside of the disk causes flux to flow from the underside of the disk upward therethrough and to return through the read heads and encoder housing to the underside of the disk. The flux leaving the upper surface of the disk is much denser or in greater concentration at the raised portions than at the recessed portions. Suitable read circuitry senses changes in the flux passing through the heads.

RELATED APPLICATIONS

This is a continuation of application S.N. 463,433, filed May 17, 1965, now abandoned, which in turn is a continuation of application S.N. 4,481, filed Jan. 25, 1960, now abandoned.

SPECIFICATION

This invention relates to a magnetic non-contact analog-to-digital converter, and more particularly to an apparatus which converts shaft position to a binary number utilizing a coded information member having a plurality of tracks with alternate segments having different magnetic characteristics in each track and means for generating a DC magnetic bias field through the information member together with a magnetic readout element or elements associated with each track for reading a binary number corresponding to any particular position of the information member.

Brush contact converters have been commonly used for converting a shaft position to binary numbers but this type of converter is subject to excessive wear on both the tracks and the brushes which decreases the resolution and also the brushes tend to chatter thus giving an erroneous readout.

Briefly stated, one preferred embodiment of the present invention consists essentially of a coded information member such as a disk which has a plurality of tracks with alternate segments in each track having different magnetic characteristics such as raised and recessed portions which vary the reluctance in a DC magnetic bias field which extends perpendicular to the surface of the disk and through a readout head having a plurality of toroidal readout elements with windings thereon. The DC bias field may be produced by a permanent magnet, or by a winding around the periphery of the disk or behind the disk, the winding being energized by a DC current. One readout element is positioned adjacent an outer track to indicate the least significant digit and a pair of readout elements are positioned adjacent each of the other tracks to provide a non-ambiguous indication of the more significant digits. Suitable readout circuitry may be used to drive each of the windings on the toroidal readout elements and suitable logic networks to provide a parallel or serial readout of a binary number corresponding to any particular position of the information member. When the toroid is adjacent a raised segment, the bias field saturates the toroid and the impedance through its winding and the output signal are close to zero. When the toroid is adjacent a recessed segment it will be unsaturated by the bias field and the impedance will be high providing a large output signal.

One object of the present invention is to provide an improved magnetic converter which will have higher resolution, is relatively simple to manufacture, and is light in weight.

Another object of the present invention is to provide a magnetic non-contact analog-to-digital converter for accurately converting shaft position to a binary number at relatively high slew speeds.

Other objects and many of the attendant advantages of this invention will be readily appreciated as the same becomes better understood by reference to the following detailed description when considered in connection with the accompanying drawings wherein.

Figure 1:
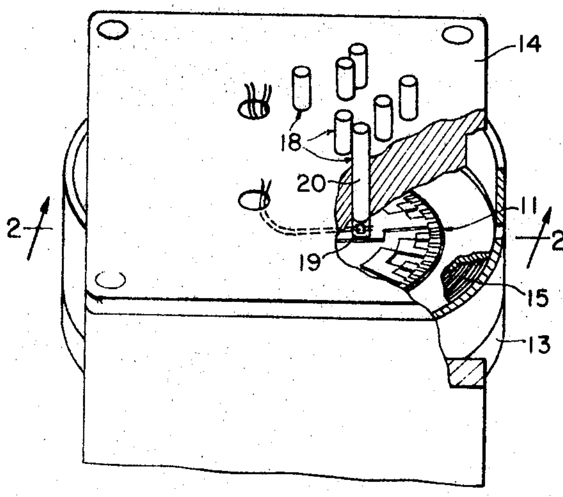
FIG. 1 is a perspective view with a portion broken away illustrating one preferred embodiment of the present invention with an annular DC bias coil mounted around the periphery of the disk.
Figure 2:
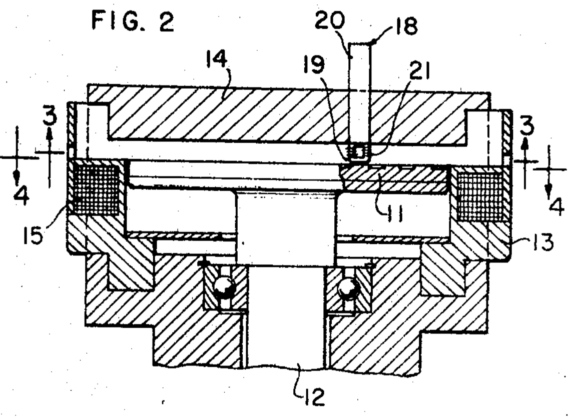
FIG. 2 is a sectional view taken on line 2—2 of FIG. 1.

Referring now to the drawings in detail, and more particularly to FIGS. 1, 2, 3 and 4, one preferred embodiment of the present invention is illustrated wherein an information member or disk 11 is mounted on a shaft 12 for rotation in a frame or housing 13, which is provided with a head mounting plate 14 positioned adjacent the surface of the information member or disk 11. A DC bias coil or permanent magnet 15 is mounted around the periphery of the rotary disk 11 in this particular embodiment to generate a DC magnetic field perpendicular to the surface of the disk 11 and through the head mounting plate 14.

Figure 4:
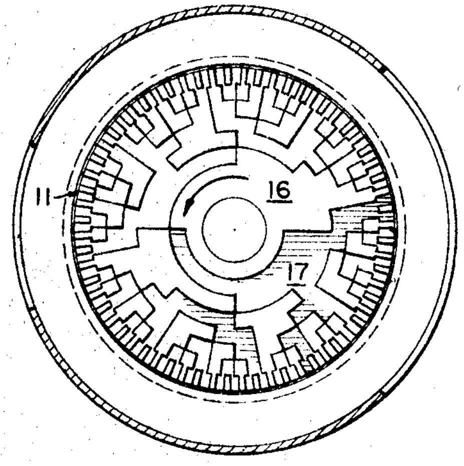
FIG. 4 is a sectional view taken on line 4—4 of FIG. 2 and showing the pattern of the converter information disk.

The disk 11, as illustrated in FIG. 4, is preferably formed of "ferrite" or some similar highly permeable magnetic material which provides a low reluctance path for the magnetic flux therethrough and may have its upper surface coded by means of alternate segments of different magnetic characteristics such as raised and recessed segments 16 and 17 to represent an ascending series of binary numbers when the shaft is rotated in a counter-clockwise direction, as indicated by the arrow in FIG. 4.

Figures 5, 8:
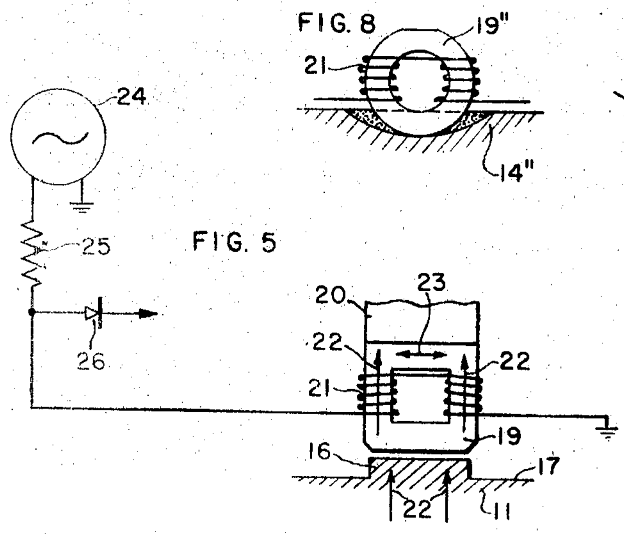
FIG. 5 is a detailed view on an enlarged scale illustrating the magnetic flux paths through one raised segment of the disk and the toroidal readout head of FIG. 1.
FIG. 8 is an enlarged sectional view illustrating a different manner of mounting a toroid readout head in the head mounting plate.
Figure 6:
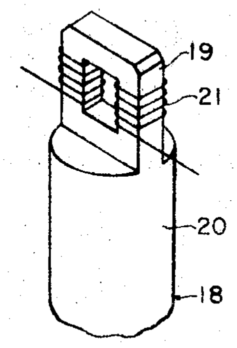
FIG. 6 is an enlarged view of one form of readout head for use in conjunction with the present invention.
Figure 7:
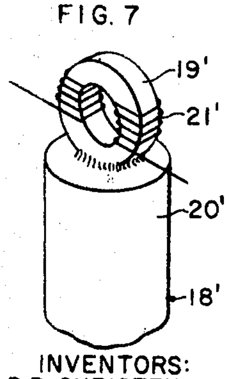
FIG. 7 is an enlarged view of another form of readout head.

The head mounting plate 14 is preferably formed of permeable magnetic material and is provided with a plurality of individual readout heads or elements 18, each of which has a toroid 19 formed or secured on the lower end of a post 20 and positioned adjacent the segments in one of the tracks on the disk 11. The toroid 19 and posts 20 are preferably formed of highly permeable magnetic material such as "ferrite" and may be integrally formed, as shown in FIG. 6, or the toroid 19 may be cemented on post 20, as shown in FIG. 7. FIG. 8 illustrates another method of mounting the toroids 19'' by using cement to secure them in shallow arcuate slots formed in the head mounting plate 14''. Toroids 19 are wound with at least one winding 21 for driving and reading out the information. For the purpose of this specification, the term "toroid" is intended to include magnetic cores of any shape having closed magnetic loop characteristics, such as shown in FIGS. 5 through 8.

FIG. 5 is a detailed partial sectional view on an enlarged scale showing one of the toroids 19 and an adjacent portion of the disk 11 and taken in a radial direction through both a raised portion 16 and recessed portions 17 of the tracks of disk 11 to illustrate the magnetic flux paths in the disk and toroid. The DC field indicated by the arrows 22 extends through the disk 11 perpendicular to the upper surface thereof and through opposite sides of the toroid 19 as shown. An alternating magnetic field indicated by the double headed arrow 23 is produced by an AC or sine wave generator 24 through the winding 21 and across a resistance 25 to provide an output through a diode 26.

It will be apparent that the DC magnetic field will be relatively strong in the opposite legs of the toroid 19 when it is adjacent a raised segment 16 where the toroid is positioned as close as possible to the permeable material on the raised segment and will be relatively weak when it is adjacent a recessed segment and there is a wide air gap between the toroid and the recessed segment 17.

When the toroid 19 is adjacent a raised segment 16 and the DC bias field 22 is at a maximum, the toroid 19 is saturated by the DC magnetic field and the impedance through the winding 21 will be close to zero, therefore, the output signal will be substantially zero. When the toroid 19 is adjacent a recessed segment 17, it will be unsaturated by the bias field and the impedance though its winding 21 will be at a maximum, providing a large output signal.

Figure 9:
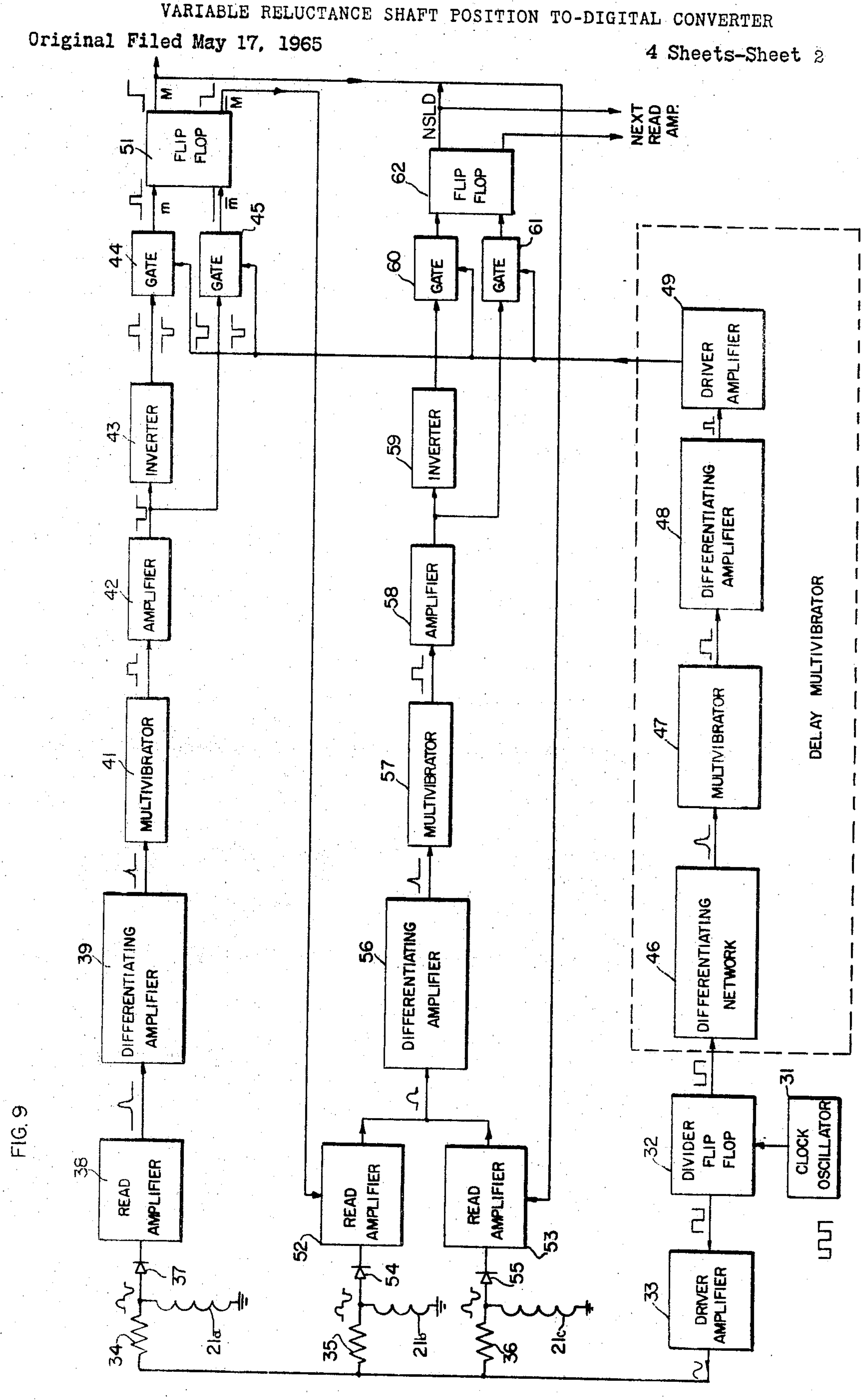
FIG. 9 is a block diagram illustrating one form of readout and logic circuitry which may be utilized to provide a parallel readout with the converter of FIG. 1.

Readout may be accomplished by interrogating the toroids 19 utilizing readout and logic circuitry, as illustrated in FIG. 9, wherein the square wave signal from the clock oscillator 31 is applied to a divider flip-flop 32 which provides complementary square wave outputs one of which goes to the driver amplifier 33 which generates a sine wave signal represented in FIG. 5 as the sine wave generator 24, for application to the toroids 19 through the windings 21 and tthe resistances 34, 35 and 36. The resistance 25 of FIG. 5 is the equivalent of resistances 34, 35 and 36. If desired, the square wave signal from flip-flop 32 may be used to drive the toroids 19.

The output signal from the toroid is taken from the junction points between the winding **21*a* and the resistance 34 and is applied through a diode 37 to a read amplifier 38. The diode 37 performs a clipping function passing only the negative peak to the read amplifier 38. The diode 37 also serves to isolate this output from a similar output if multiple converters are interconnected. The output signal from read amplifier 38 is applied to a differentiating amplifier 39 for generating a spike or triggering pulse to activate a monostable multivibrator or triggered blocking oscillator 41 which provides an essentially square pulse output of fixed duration when triggered by the pulse from the differentiating amplifier 39. This square pulse is amplified and inverted in an amplifier 42 and a complementary pulse is provided by the inverter 43. Both pulses are applied simultaneously to the respective gates 44 and 45 together with gating pulses which are derived by a delay multivibrator from the other complementary square wave output from the divider flip-flop 32 which is applied to a differentiating network 46 providing a spike or triggered pulse for triggering a monostable multivibrator or triggered blocking oscillator 47. The square pulse output from multivibrator 47 is applied through a differentiating amplifier 48 and a driver amplifier 49 to provide a narrow gating pulse which occurs during the interval of the signal pulses from the amplifier 42 and inverter 43. The gating pulse from the driver amplifier 49 is applied to the gates 44 and 45**.

The wave forms illustrated occur when toroid 19 is adjacent a recessed segment 17 and the toroid 19 is unsaturated so that its impedance is at a maximum, thus providing a large output signal.

When the toroid 19 is adjacent a raised segment 16 and is saturated by the DC magnetic field, the output signal will be substantially 0 at the junction between the winding **21*a* and the resistance 34, thus no signals will appear from the read amplifier 38, differentiating amplifier 39, multivibrator 41 and the amplifier 42, and therefore, a constant DC level will appear at the gates 44 and 45** for a no-signal condition.

It will be apparent that the constant voltage level from the inverter 43 will be low or negative and the constant voltage level from the amplifier 42 will be high or at ground. Under these conditions a negative gating signal from the driver amplifier 49 applied to gates 44 and 45 will have no effect on the gate 44 which will remain closed, but will open the gate 45 applying a signal, such as a short duration pulse, to the $\overline{m}$ input of flip-flop 51 which will provide a high level or ground output on the $\overline{\text{M}}$ side and a lowe level or negative output from the M side of flip-flop 51.

When the toroid 19 is adjacent a recessed segment 17 it will be unsaturated and its impedance will be at a maximum providing a large output signal at the junction between the winding **21*a* and resistance 34, as indicated by the waveform in FIG. 9. The negative peaks of this waveform will pass through the diode 37 to the read amplifier 38 and provide an output signal which is differentiated by the differentiating amplifier 39 to trigger the multivibrator 41. The square pulse output of multivibrator 41, as indicated in the waveform, is inverted by the amplifier 42 and again by the inverter 43, so that complementary pulses are applied to the gates 44 and 45 in time coincidence with the gating pulses from the driver amplifier 49**.

Under these conditions the negative gating pulse, together with the low level signal from the amplifier 42, will leave gate 45 closed, whereas the negative gating pulse in coincidence with the high level pulse from the inverter 43 will open gate 44 and apply a short duration pulse to the *m* side of the flip-flop 51 providing a high level signal from the M side of the flip-flop 51 and a low level signal from the $\overline{\text{M}}$ side.

The output signal from the $\overline{\text{M}}$ side of the flip-flop may be used to provide a high level signal indicating a binary 1 when the readout element or toroid 19 is adjacent a raised segment and a low level signal representing a binary 0 when the readout element or toroid 19 is adjacent a recessed segment. Alternatively, the output signal may be taken from the M side of the flip-flip 51 which will give a low level signal for binary 0 when the toroid 19 is positioned adjacent a raised segment and a high level signal or a binary 1 when the toroid 19 is adjacent a recessed segment. Thus, by taking the output from the M or the $\overline{M}$ side of the flip-flop, the coded information disk 11 can be read in either a counterclockwise direction or in a clockwise direction to provide an ascending order of binary numbers.

The output signal from the $\overline{M}$ side of the flip-flop 51 is fed back to another readout amplifier 52 to control its operation and the M output from the flip-flop 51 is fed back to another readout amplifier 53 to control its operation. The readout amplifiers 52 and 53 are connected through diodes 54 and 55, respectively, and resistances 35 and 36 to the driver amplifier 33 with windings 21*b* and 21*c* connected to ground from the junction points, as shown. The windings 21*b* and 21*c* are associated with leading and lagging readout elements in the next track on the coded information member or disk 11 to provide a nonambiguous readout of the next least significant digit in accordance with the rule that when the least significant digit is a binary 0 a leading readout element should be read, and when the least significant digit is a binary 1, then a lagging readout element should be read in the next least significant digit track.

One or the other of readout amplifiers 52 or 53 will be energized in accordance with the condition of the flip-flop 51 and the output signal from the selected amplifier will be applied to the differentiating amplifier 56 which triggers the multivibrator 57 for applying a square pulse to the amplifier 58 and inverter 59. The complementary square pulse signals from amplifiers 58 and 59 are applied to gates 60 and 61, together with gating pulses from the driver amplifier 49 which functions in the same manner described above with regard to flip-flop 51 to control the operation of flip-flop 62.

The output signals from flip-flop 62 can be used in an aanalogous manner to provide an indication of the next least significant digit and both output signals will also be applied to the next pair of readout amplifiers (not shown). Obviously as many flip-flops with associated readout circuitry may be provided as are required, to provide a binary indication for each track on the information member or disk 11.

Figure 12:
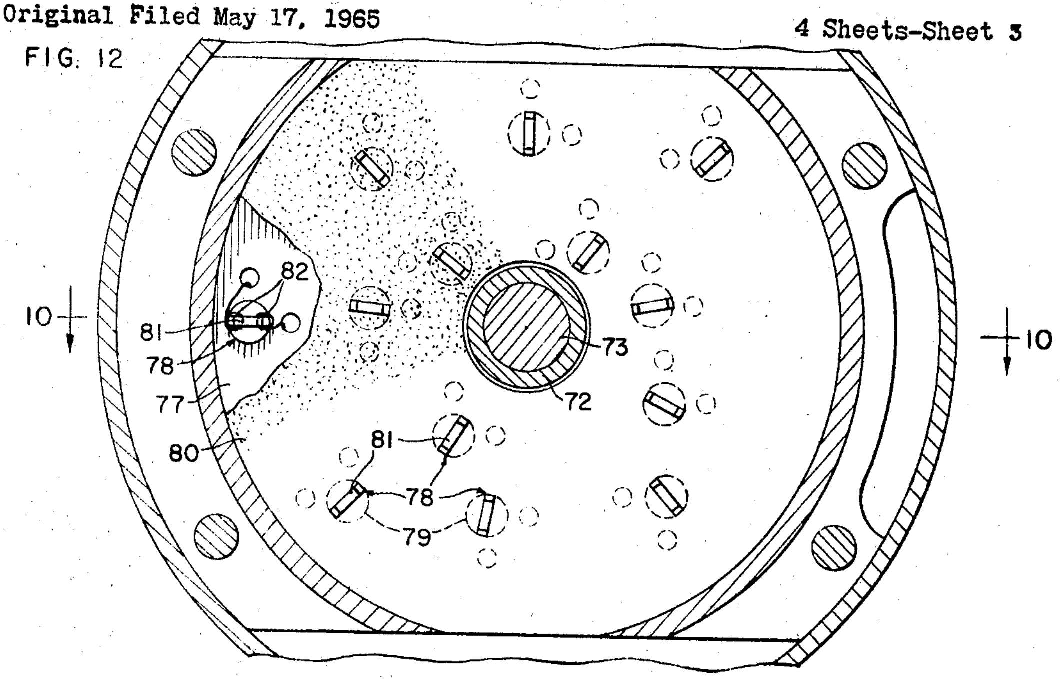
FIG. 12 is a bottom plan view of the readout head of FIG. 11 with portions broken away.
Figure 10:
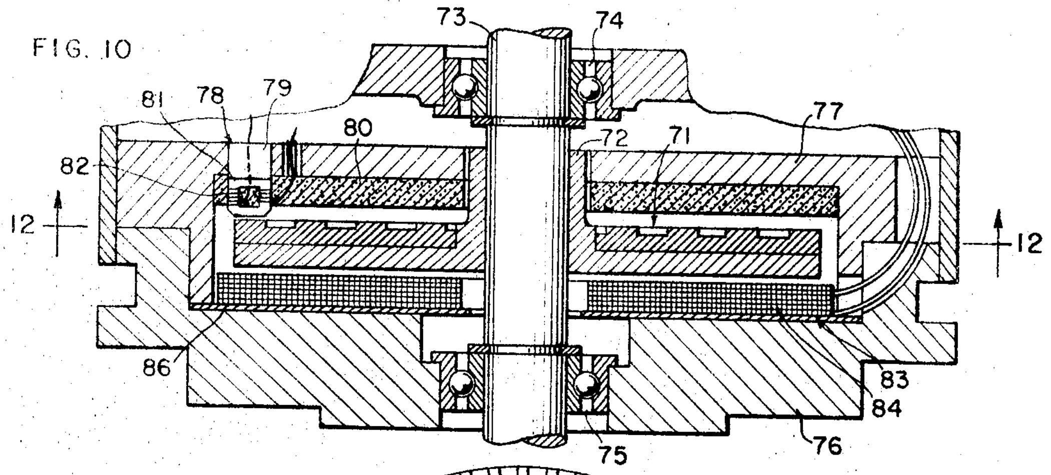
FIG. 10 is a sectional view illustrating another preferred embodiment of the present invention with a flat DC bias coil mounted behind the disk.
Figure 11:
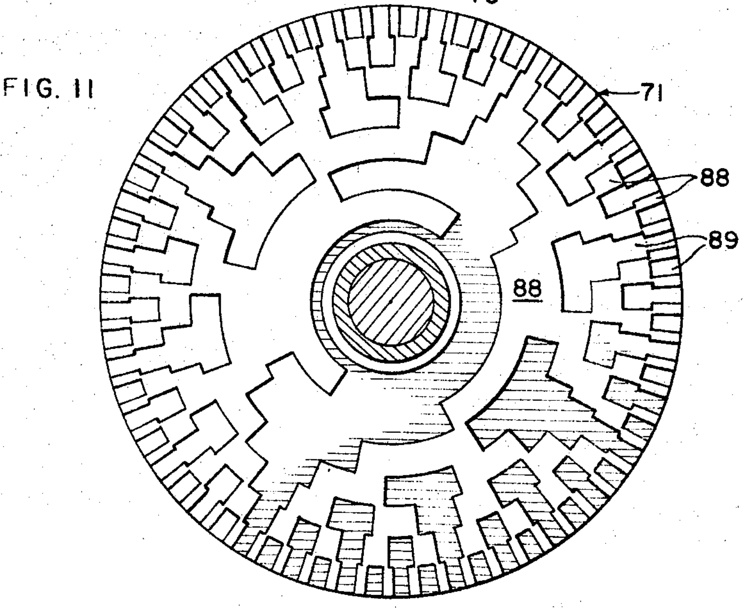
FIG. 11 is a top plan view of the converter information disk of FIG. 10.

Another preferred embodiment of the present invention is illustrated in the sectional view of FIG. 10, and the top and bottom plan views of FIGS. 11 and 12, wherein the coded "ferrite" information disk 71 is mounted on a hub 72 which is secured to a shaft 73 rotatably mounted in bearings 74 and 75 in a housing or frame 76. Frame 76 also supports a head mounting plate 77 having a plurality of readout heads or elements 78 mounted therein.

Figure 3:
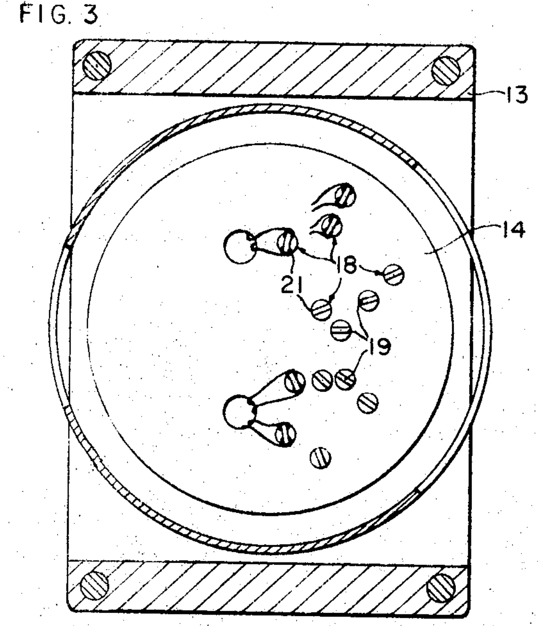
FIG. 3 is a sectional view taken on line 3—3 of FIG. 2 and showing the bottom of the readout head.

Each of the readout elements 78 consist of a mounting post 79 having a toroid 81 integrally formed or mounted on the end thereof and at least one winding 82 for driving the toroid 81 and reading out the information on coded disk 71. These readout elements 78 are similar to the readout elements 18 in the embodiment of this invention shown in FIGS. 1 through 4. As shown in FIG. 10, the head mounting plate 77 is preferably formed of a permeable magnetic material, such as steel or soft iron, and may be filled with a suitable potting compound 80 which surrounds and supports the readout elements 78, leaving a small portion of the lower end of the toroid extending outward into juxtaposition with the associated tracks on the disk 71. The particular coding of the disk 71 as illustrated in FIG. 11 and the positioning of the readout elements 78 shown in the bottom plan view of FIG. 12 will be quite different than the comparable views of the other modification, as illustrated in FIGS. 3 and 4, however, this arrangement performs the same function and the raised and recessed segments 88 and 89 in each track are merely skewed with respect to each other and the readout elements 78 are moved correspondingly to provide an optimum spacing of the readout elements 78 from each other in order to minimize cross talk between the readout elements 78.

In this modification, the DC bias coil or permanent magnet 83 is in the form of a relatively flat annular disk mounted in the housing 76 behind the hub 72 and disk 71. The bias coil 83 consists of a large number of turns of fine wire 84 preferably wound and encapsulated adjacent to an iron or steel backing disk 86. This construction is adapted to provide an optimum path for the magnetic flux through the housing 76, head mounting plate 77, "ferrite" readout elements 78 and the "ferrite" disk assembly 71.

In both modifications it is desirable to make the housing and head mounting plate of permeable magnetic material such as steel or soft iron to provide a low reluctance closed path for the magnetic flux from the bias coil, otherwise a much more powerful magnet would be required.

If desired, the disk 71 or the disk 11 may be geared to similar assemblies to provide for the reading of additional, more significant digits of a binary number.

Figure 13:
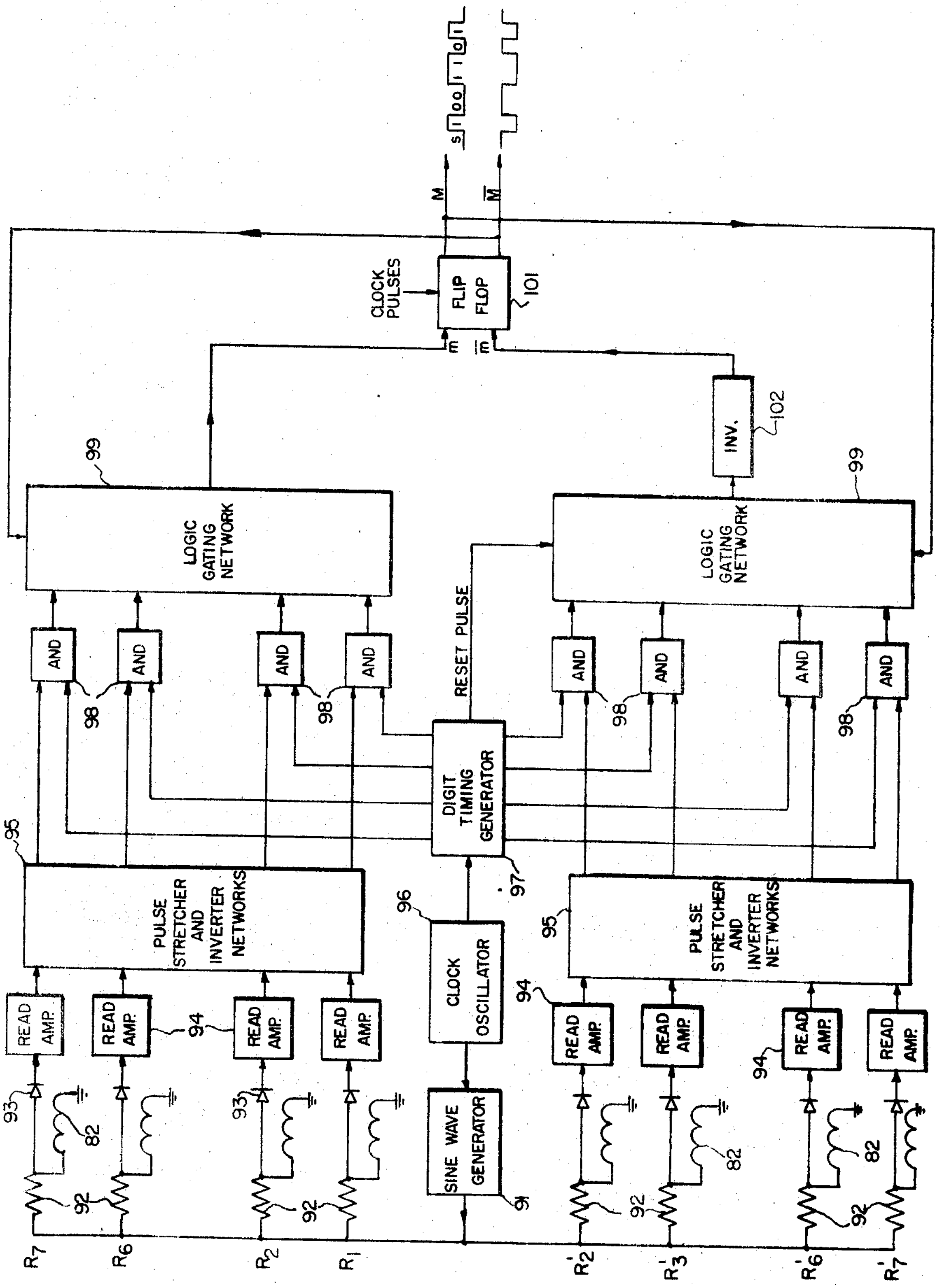
FIG. 13 is a block diagram of one preferred form of readout and logic circuitry which may be utilized to provide a serial readout from the converter illustrated in FIGS. 10 through 12.

This embodiment functions in the same manner as the modification illustrated in FIGS. 1 through 4 and could utilize the readout circuitry illustrated in FIG. 9, however, another form of readout and logic circuitry is illustarted in FIG. 13 which may be utilized to provide a serial readout from the converter illustrated in FIGS. 10 through 12 and may also be utilized in conjunction with the modification of FIGS. 1 through 4. It will be apparent that the flux path of the DC bias field produced by the coil 83 will have the same effect on the toroids 81 as that illustrated in FIG. 5 with respect to the toroid 19 and the disk 11.

In the block diagram of FIG. 13 the toroid windings 82 are driven by a sine wave generator 91 through a plurality of parallel resistances 92 to provide a series of output signals through a plurality of diodes 93 which feed the different signals into its associated read amplifier 94 and then through two sets of pulse stretcher and inverter networks 95.

A clock oscillator 96 triggers and synchronizes the sine wave generator 91, as well as a digit timing generator 97, which provides a series of timing pulses in sequence to the "and" gates 98 which also receive the signals from the pulse stretcher and inverter networks 95. The "and" gates 98 effectively sample the signals derived from the readout elements by first sampling the signal from the readout element $R_1$, next sampling the signal from the readout elements $R_2$ and $R_2'$, and so on through the readout elements $R_7$ and $R_7'$ to the logic gating networks 99 which function to select a leading or lagging readout element in accordance with the previous output signal from the flip-flop 101 which is fed back into the logic gating networks 99.

The logical network illustrated in FIG. 13, including the digit timing generator 97, and gates 98 and logic gate networks 99, together with flip-flop 101 and the inverter 102 function in a manner very similar to that disclosed in detail in Pat. No. 3,056,956, issued Oct. 2, 1962, to Retzinger for an Analog-to-Digital Converter.

A reset pulse from the digit timing generator 97 is applied to the lower or lagging logic gating network 99 to preset the flip-flop by means of a signal through the inverter 102 to the $\overline{m}$ input side of the flip-flop 101 which provides a low starting level in the M output and a high starting signal from the $\overline{M}$ output from the flip-flop 101. The high signal from the $\overline{M}$ output is fed back to the upper or leading logic gating network 99 so that the signal from the readout element $R_1$ is read next. If the readout element $R_1$ reads a binary 1 which provides a high output as indicated in the waveform at the M output of the flip-flop 101, then the lower or lagging logic gating network 99 is next activated, and if the signal from the $R_2'$ readout element reads a binary 0, it will be passed through the logic gating network 99, inverter 102 and flip-flop 101 to trigger the flip-flop to the opposite state for indicating a binary 0. The rest of the readout elements are read in similar manner to provide a binary output from the M side of the flip-flop 101, as indicated and a complementary output from the $\overline{M}$ side of the flip-flop 101.

Obviously many other modifications and variations of the present invention may be made within the scope of the following claims.

What is claimed is:

1. A magnetic analog-to-digital converter comprising:
an information member having, in one surface, at least one track of raised and recessed segments, said surface capable of emanating magnetic flux across its entire area;
closed magnetic loop sensing means positioned adjacent each track and movable relative thereto, said sensing means being susceptible of becoming substantially saturated by magnetic flux emanating from the surface of said information member when said sensing means is adjacent a raised segment; and
circuit means coupled to said magnetic sensing means for generating an alternating magnetic flux in said sensing means independent of the magnetic flux emanating from the surface of said information member, and for producing an output signal indicative of the existence and absence of substantial saturation of said sensing means by the magnetic flux from said information member.

2. The magnetic analog-to-digital converter claimed in claim 1, further comprising: flux generating means for producing a DC bias flux through said information member, said flux generating means including a winding adjacent said member and substantially parallel to the segmented surface thereof.

3. The magnetic analog-to-digital converter claimed in claim 1, wherein said information member comprises a rotatable disk of a highly permeable material.

4. The magnetic analog-to-digital converter claimed in claim 1, wherein said magnetic sensing means includes a toroid core member positioned adjacent the surface of said information member and within the field of magnetic flux from said information member, said core member having at least one winding coupled to said circuit means.

5. The magnetic analog-to-digital converter claimed in claim 4, wherein said circuit means includes excitation means for applying an AC signal to the winding on said toroid core member and further includes means for detecting impedance changes in said winding as relative movement between said information member and said core member changes the magnetic influence on said core member.

6. The magnetic analog-to-digital converter claimed in claim 3, wherein said rotatable disc contains, on one surface, a plurality of concentric tracks of alternate raised and recessed segments, the segments in each track having an angular length different from those in adjacent tracks, each track representing one bit in a binary code.

References Cited

UNITED STATES PATENTS

| | | | |
|---|---|---|---|
| 2,441,380 | 5/1948 | Zuschlag. | |
| 2,933,718 | 4/1960 | Arsenault. | |
| 2,933,721 | 4/1960 | Hagopian. | |
| 2,942,252 | 6/1960 | Wolff | 340—347 |
| 2,978,599 | 4/1961 | Wilcox | 310—168 |
| 3,007,067 | 10/1961 | Snyder. | |
| 3,113,300 | 12/1963 | Sullivan | 340—347 |

MAYNARD R. WILBUR, Primary Examiner

M. K. WOLENSKY, Assistant Examiner